METHOD OF MANUFACTURING MULTICONTACT PLUG-IN CONNECTORS

Sept. 30, 1969 F. J. C. LEYSSENS ET AL 3,469,312

METHOD OF MANUFACTURING MULTICONTACT PLUG-IN CONNECTORS

Filed Jan. 14, 1966 2 Sheets-Sheet 2

United States Patent Office 3,469,312

Patented Sept. 30, 1969

3,469,312

METHOD OF MANUFACTURING MULTICONTACT PLUG-IN CONNECTORS

Francois Jeanne Charles Leyssens, Borgerhout, and Lodewijk Viktor Hendrik Maria Ghys, Edegem, Belgium, assignors to International Standard Electric Corporation, New York, N.Y., a corporation of Delaware Filed Jan. 14, 1966, Ser. No. 520,576
Claims priority, application Netherlands, Jan. 20, 1965, 6500682
Int. Cl. B23p *17/00;* H05k *3/00*
U.S. Cl. 29—629 5 Claims

ABSTRACT OF THE DISCLOSURE

A method is provided for manufacturing plug-in connectors formed of short strips of conductive tape supported by an insulating moulding material. In practicing the method, conductive tapes are cut and bent to desired forms, the tapes are placed in a mould, and the moulding material is placed into the mould. When the mould is disassembled, the desired connectors are formed.

The present invention relates to a method of manufacturing a multicontact plug-in connector suitable to be secured on the end of a printed circuit board, said connector including an insulating support and a set of contact tapes which are bent over a strip of said insulating support.

Such a method is known from the British Patent 913,-092 issued to J. Bernutz in 1963. This known method is complicated and the plug-in connector thus manufactured necessitates an additional supporting piece for being secured to the printed circuit board end, as well as an additional coding strip if it is required to associate a mechanical code to the connector or to the board to which it is secured.

It is an object of the present invention to provide a method of manufacturing a plug-in connector of the above type, which is simpler and more economical than the above known method, the connector manufactured by this method being also simple and not necessitating additional pieces for coding or securing purposes.

The present invention is characterized by the fact that a set of parallel contact tapes is used, the contact tapes of said set being identically bent in a dissymmetrical U-shape, i.e. each U-shaped tape has a long and a short leg. The set of tapes is introduced in an appropriate injection type moulding apparatus into which an insulating material is injected through injection channels. As a result, an insulating support is formed about an assembly of contact tapes in one moulding operation.

The above mentioned and other objects and features of the invention will become more apparent and the invention itself will be better understood by referring to the following description of preferred embodiments taken in conjunction with the accompanying drawings, in which:

FIG. 1 schematically represents a front view of an embodiment of a plug-in connector according to the invention;

Figure 1:
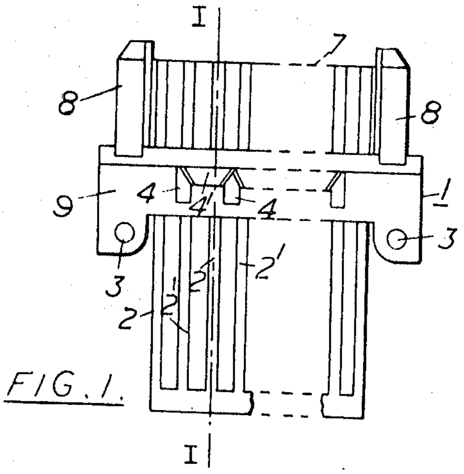
Figure 2:
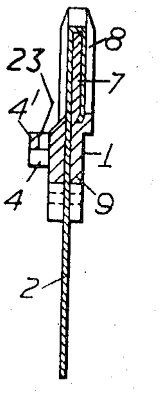
FIG. 2 is a cross-sectional side view along the line I—I of FIG. 1.
Figure 3:
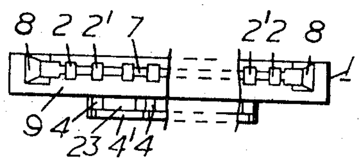
FIG. 3 is an upper plan view of the connector of FIG. 1.
Figure 5:
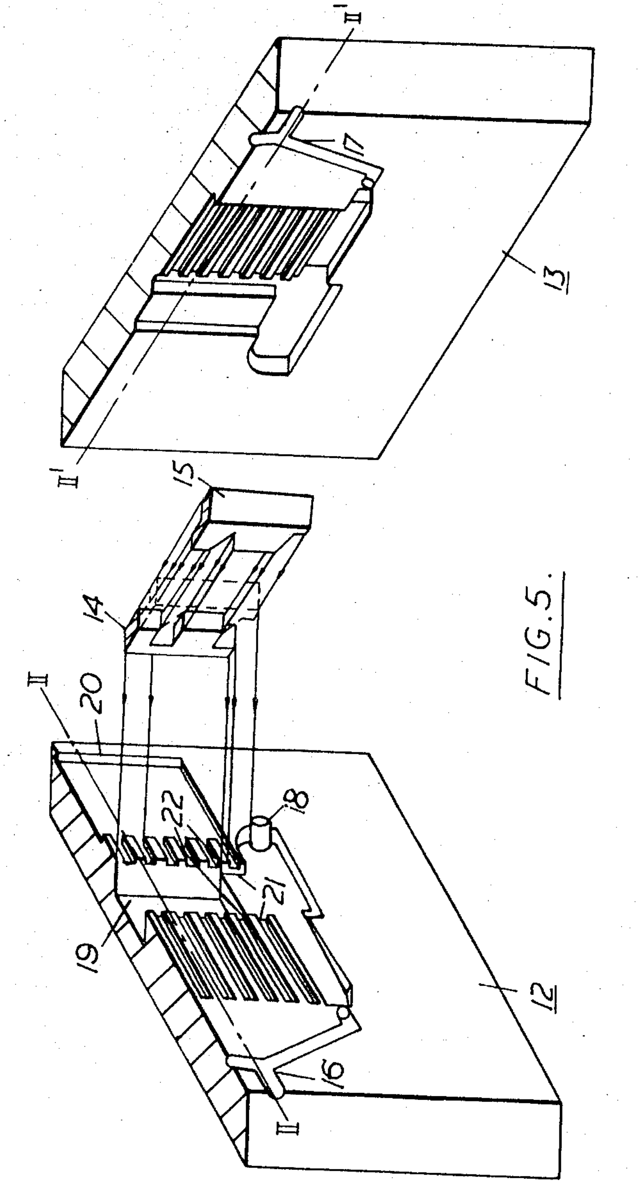

FIG. 5 schematically shows an embodiment of a moulding apparatus, according to the invention, for manufacturing the plug-in connector of FIGS. 1, 2, 3.

Referring to FIGS. 1, 2 and 3, the plug-in connector 1 shown therein consists of a set of contact tapes 2, 2′ and a moulded insulating support which comprises a strip 7 with two guide and contact protecting projections 8, located at either side or end thereof, a supporting bracket 9 and a mechanical code strip 4, 4′. The contact tapes 2, 2′ which are identically bent over the strip 7 have a dissymmetrical U-shape, i.e. each U-shaped tape has a long and a short leg, the short and the long legs of the tapes 2 and 2′ passing through and protruding from the bracket 9. The mechanical code strip is constituted by a number of equally spaced guiding ribs 4 which protrude from one face of the supporting bracket and a number of obturating bars 4′ each extending between two successive guiding ribs 4, a gap 23 (FIG. 2) being provided between each bar 4′ and the one face of the bracket 9.

According to the code attributed to the connector 1, or more precisely to the printed circuit board (not shown) to the end of which the connector 1 is secured, some of the obturating bars 4′ may be cut away. The gap 23 between the obturating bars 4′ and the one face of the bracket 9 facilitates this cutting operation. The female connector (not shown) which corresponds to the above male or plug-in connector 1 contains counterpart coding projections or coding inserts (not shown) such that when the male connector 1 is plugged in this female connector the coding projections of the female connector fit between the guiding ribs 4 of which the obturating bars 4′ have been cut away. In this way erroneous plugging-in is prevented. The other face of the supporting bracket 9 (FIG. 2) assumes a step-shaped surface for receiving the end of the printed circuit board (not shown) to which it will be secured. The hole 3 of the bracket 9 serve for this purpose.

Figure 4:
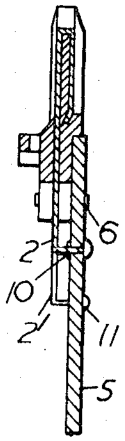
FIG. 4 shows the plug-in connector of FIG. 2 secured to the end of a printed circuit board.

FIG. 4 shows how the plug-in connector 1 may be secured to the end of a printed circuit board 5, as well as connections of the contact tapes 2 and 2′ with the printed conductors 10 and 11 of the board 5 respectively. The long legs of the contact tapes 2 and 2′ which protrude from the bracket 9 are cut at two different lengths, and their ends are bent at right angles. The plug-in connector 1 is secured to the printed circuit board 5 by means of two rivets 6 which pass through the holes 3 of the bracket 9 (FIG. 1) and corresponding holes of the board 5. The above bent ends of the contact tapes 2 and 2′ pass through corresponding eyelets of the board 5 and are soldered to the conductors 10 and 11 printed on the one and other sides of the board 5 respectively. It is to be noted that by cutting the above ends of the contact tapes 2 and 2′ at different lengths, the realization of wrapped connections with circuits of the board 5 is facilitated, as more free space is thus provided between these ends.

The above described plug-in connector 1 is manufactured by means of the injection type moulding apparatus of which part is shown in FIG. 5. This moulding apparatus is constituted by two main moulding pieces, i.e. a lower piece 12 having an axis of symmetry II—II and an upper piece 13 having an axis of symmetry II′—II′. These moulding pieces are used for moulding faces of the insulating support, 7, 8, 9. Two coding pieces 14, 15 are used for moulding the mechanical code strip 4, 4′ of FIGS. 1, 2, 3. The coding pieces 14, 15 are positioned in a corresponding recess 19 of the lower piece 12 in a way made evident by the position of the coding piece 15 indicated in dotted lines and by the arrows. The protuberance 18 on the lower piece 12 serves for moulding a hole 3 in the bracket 9 (FIG. 1).

The main pieces 12 and 13 are each provided with a respective half channel 16 and 17 of semi-circular cross-section which form two branches enabling the injection of moulding material at two ends of the mould. It is obvious that when the main pieces 12 and 13 are assembled preparatory to a moulding operation that the semi-circular channels 16 and 17 constitute a single channel of circular cross-section. Hereinafter, the method of manufacturing the plug-in connector 1 (FIGS. 1, 2, 3) will be described.

The coding pieces 14, 15 are first positioned in the recess 19 of the lower main piece 12. Afterwards the set of parallel contact tapes 2 and 2' (FIG. 1), which by way of example may be made of brass metal and bent in the way shown in FIG. 2, is positioned in the corresponding recesses 21 and 22 of the lower piece 12 in such a manner that the lower horizontal bar of the set (FIG. 1) makes contact with the edge 20 of this piece 12. The upper and lower main pieces 12 and 13 are then secured together by fastening means (not shown). Finally an insulating moulding material, e.g. polyacetal, is injected under pressure through the channel 16, 17 by means of an injecting apparatus (not shown). The plug-in connector of FIGS. 1, 2, 3 is obtained by disassembling the pieces 12 and 13.

While the principles of the invention have been described above in connection with specific apparatus, it is to be clearly understood that this description is made only by way of example and not as a limitation on the scope of the invention.

We claim:

1. A method for manufacturing a multicontact plug-in connector for use on the end of a printed circuit board, comprising the steps of:

supplying a set of contact tapes, cutting said tapes to desired lengths, bending each of said contact tapes in a dissymmetrical U-shape having a long leg and a short leg, bending said contact tapes at the extremetry of their respective short legs to provide a mechanical connector for supporting means, bending said contact tapes at the extremetry of their respective long legs to provide mechanical and electrical connectors which are offset from each other, supplying an injection type moulding apparatus having an injection channel and recesses for receiving and supporting said set of contact tapes and a molding device for forming obturating bars occupying part of said channel, placing said set of contact tapes in said recesses in said injection type moulding apparatus, injecting insulating material into said moulding apparatus through said injection channel around the tapes and hardening said material, and removing said moulding apparatus to provide a plug-in support composed of U-shaped contact tapes bent over and supported by a strip of insulating material having obturating bars.

2. A method for manufacturing a multicontact plug-in connector substantially as claimed in claim 1, in which additional steps include forming said moulding apparatus by placing first and second main pieces together to enable the formation from said insulating material of a bracket serving to imbed portions of the legs of said contact strip, a strip supporting the contact strips to provide contact surfaces and a guide projection for guiding the plug-in connector for making connections.

3. A method for manufacturing a multicontact plug-in connector substantially as claimed in claim 2, in which additional steps include substituting a new second main piece in said moulding apparatus for forming a step-shaped surface for receiving said printed circuit board.

4. A method for manufacturing a multicontact plug-in connector substantially as claimed in claim 1, wherein said device is a mechanical code strip having obturating bars on one side thereof such that modification of the code is possible by cutting away selected obturating bars after the molding process is completed.

5. A method for manufacturing a multicontact plug-in connector substantially as claimed in claim 3, in which additional steps include forming said moulding apparatus by placing together first and second main pieces for forming equally spaced guiding ribs in said plug-in support, said device to one side of said bracket and protruding therefrom, and a gap between said device and said bracket.

References Cited

UNITED STATES PATENTS

| | | | |
|---|---|---|---|
| 2,874,363 | 2/1959 | Ainsworth ______ | 29—630 XR |
| 3,189,864 | 6/1965 | Angele et al. ______ | 339—17 XR |
| 3,278,887 | 10/1966 | Travin __________ | 339—17 XR |

JOHN F. CAMPBELL, Primary Examiner

U.S. Cl. X.R.

29—407, 528, 626, 627; 174—68.5; 264—272; 339—17